United States Patent [19]

Mak

[11] Patent Number: 5,707,664

[45] Date of Patent: Jan. 13, 1998

[54] HEATED NOZZLE MANIFOLDS IN A COMMON PLANE INTERCONNECTED THROUGH CONNECTOR MANIFOLDS

[75] Inventor: Chun Keung Mak, Markham, Canada

[73] Assignee: Mold-Masters Limited, Georgetown, Canada

[21] Appl. No.: 692,707

[22] Filed: Aug. 6, 1996

[30] Foreign Application Priority Data

Jul. 5, 1996 [CA] Canada ................ 2180601

[51] Int. Cl.⁶ .................................. B29C 45/22
[52] U.S. Cl. ............... 425/549; 264/297.2; 264/297.8; 264/328.8; 264/328.14; 264/328.15; 425/570; 425/572; 425/588
[58] Field of Search ................... 425/547, 548, 425/549, 570, 571, 572, 581, 588, 573; 264/328.8, 328.14, 328.15, 297.2, 297.8

[56] References Cited

U.S. PATENT DOCUMENTS

4,219,323  8/1980  Bright et al. .
4,761,343  8/1988  Gellert .
5,032,078  7/1991  Benenati ................ 425/572

*Primary Examiner*—Tim Heitbrink
*Attorney, Agent, or Firm*—Dalesman & Company

[57] ABSTRACT

Injection molding apparatus with a central heated manifold, a pair of connector manifolds, and at least four nozzle manifolds mounted to extend in a common plane in a mold. A number of heated nozzles extend from each nozzle manifold. A melt passage branches in each nozzle manifold and the nozzle manifolds are made so thermal expansion slides the branches of the melt passage into exact alignment with central melt bores through the nozzles. The central manifold and the two connector manifolds extend along a central axis and each connector manifold is between each pair of nozzle manifolds which are offset from the central axis. Connector bushings slidably connect each connector manifold rearwardly to the central manifold and sidewardly to each nozzle manifold. The connector bushings slide sufficiently to provide sufficient compensation for thermal expansion and contraction to allow either the connector manifolds or the nozzle manifolds to be centrally located relative to the cooled mold, which reduces the distances the melt passage branches must slide to be in proper alignment.

17 Claims, 7 Drawing Sheets

HEATED NOZZLE MANIFOLDS IN A COMMON PLANE INTERCONNECTED THROUGH CONNECTOR MANIFOLDS

BACKGROUND OF THE INVENTION

This invention relates generally to injection molding and more particularly to a pair of heated connector manifolds extending between a heated central manifold and four or more heated nozzle manifolds all mounted in a common plane in a cooled mold in such a manner as to move or compensate for thermal expansion and contraction of the manifolds.

It is well known in the injection molding field to simultaneously inject a number of cavities by having a number of spaced nozzles extending from a single heated nozzle manifold. The melt passage branches in the nozzle manifold with each branch leading to a melt bore through one of the nozzles. The nozzles are fixed in place in the cooled mold and thermal expansion and contraction of the heated nozzle manifold causes the nozzle manifold to slide across the rear ends of the nozzles. It is very important that each branch of the melt passage be aligned exactly with the melt bore through the nozzle, particularly in view of the high temperature and pressure conditions of an injection molding system. Therefore, the amount of movement at each nozzle location must be precalculated and the branches of the melt passage dimensioned precisely to slide into exact alignment with the melt bores of the nozzles when the operating temperature is reached. While this conventional technique is acceptable for smaller injection molding systems, it becomes more difficult to provide for the nozzle manifold sliding the greater distances required for larger manifold systems.

Furthermore, there is an increasing demand for injection molding systems having greater numbers of cavities. As seen in U.S. Pat. No. 4,761,343 to Gellert which issued Aug. 2, 1988, it is known to increase the number of cavities by interconnecting a number of support nozzle manifolds with a bridging manifold. Allowance for the increased thermal expansion and contraction is provided by the bridging manifold sliding across the tops of the support manifolds. However, this bridging configuration has the disadvantage that the support manifolds and the bridging manifold must extend in two different planes which is not acceptable in some applications such as stack molding in which minimum mold height is required. This configuration also has the disadvantage that the branches of the melt passage in the bridging manifold still must slide into alignment with the melt passages in the support manifolds. As a result, while there is allowance for thermal expansion there is no real compensation for it in the sense that the dimensioned change due to thermal expansion is absorbed.

U.S. Pat. No. 4,219,323 to Bright et al. which issued Aug. 26, 1980 shows two heated nozzle manifolds interconnected by a connecting link. While this has the advantages that the nozzle manifolds and the connecting link all extend in the same plane and that the connecting link does absorb the thermal expansion, it has the disadvantages that only two nozzle manifolds can be interconnected and that bushings are required inside the connecting link to cover the expansion slots to prevent melt leakage at the high temperature and pressure conditions of operation.

SUMMARY OF THE INVENTION

Accordingly, it is an object of the present invention to at least partially overcome the disadvantages of the prior art by providing injection molding apparatus with heated connector manifolds extending in the same plane as and between a heated central manifold and at least four heated nozzle manifolds to provide compensation for thermal expansion and contraction.

To this end, in one of its aspects, the invention provides injection molding apparatus having a heated central manifold and a plurality of heated nozzle manifolds mounted in a mold with a melt passage branching in the central manifold for conveying melt through the nozzle manifolds from a central inlet in the central manifold to a plurality of heated nozzles extending from each nozzle manifold. Each nozzle is seated in the mold with a central melt bore extending in alignment with a gate leading to a cavity.

In one aspect of this invention, the central manifold is centrally located relative to the mold. A pair of connector means, preferably connector manifolds, extend in opposite directions from the central manifold thereby defining a central axis. At least one pair of heated nozzle manifolds are mounted on opposite sides of each connector means, whereby each nozzle manifold is offset from the central axis with the central manifold, the nozzle manifolds and the connector means all extending in a common plane. Locating means locate at least each of the connector means or each of the nozzle manifolds relative to the mold. The melt passage branches in the central manifold and extends outwardly from the central manifold to each connector means, then branches in each connector means and extends sidewardly to each of the nozzle manifolds, and then branches again in each nozzle manifold and extends to the melt bore through each nozzle extending from each nozzle manifold.

Each connector means is slidably connected rearwardly to the central manifold and also slidably connected sidewardly to each adjacent nozzle manifold. In this manner, the invention enables the injection molding apparatus to compensate for thermal expansion and contraction of the heated manifolds relative to the cooled mold sufficiently to enable at least one of the connector means and the nozzle manifolds to be located relative to the mold while enabling all of the manifolds to be located in a single plane in the mold. Each nozzle manifold is made and mounted so thermal expansion within the central manifold, connector means, and nozzle manifolds slides the branches of the melt passage into alignment with the melt bores through the nozzles when the manifolds and connector means are heated to the operating temperatures.

Further objects and advantages of the invention will appear from the following description taken together with the accompanying drawings.

DETAILED DESCRIPTION OF THE INVENTION

Figure 1:
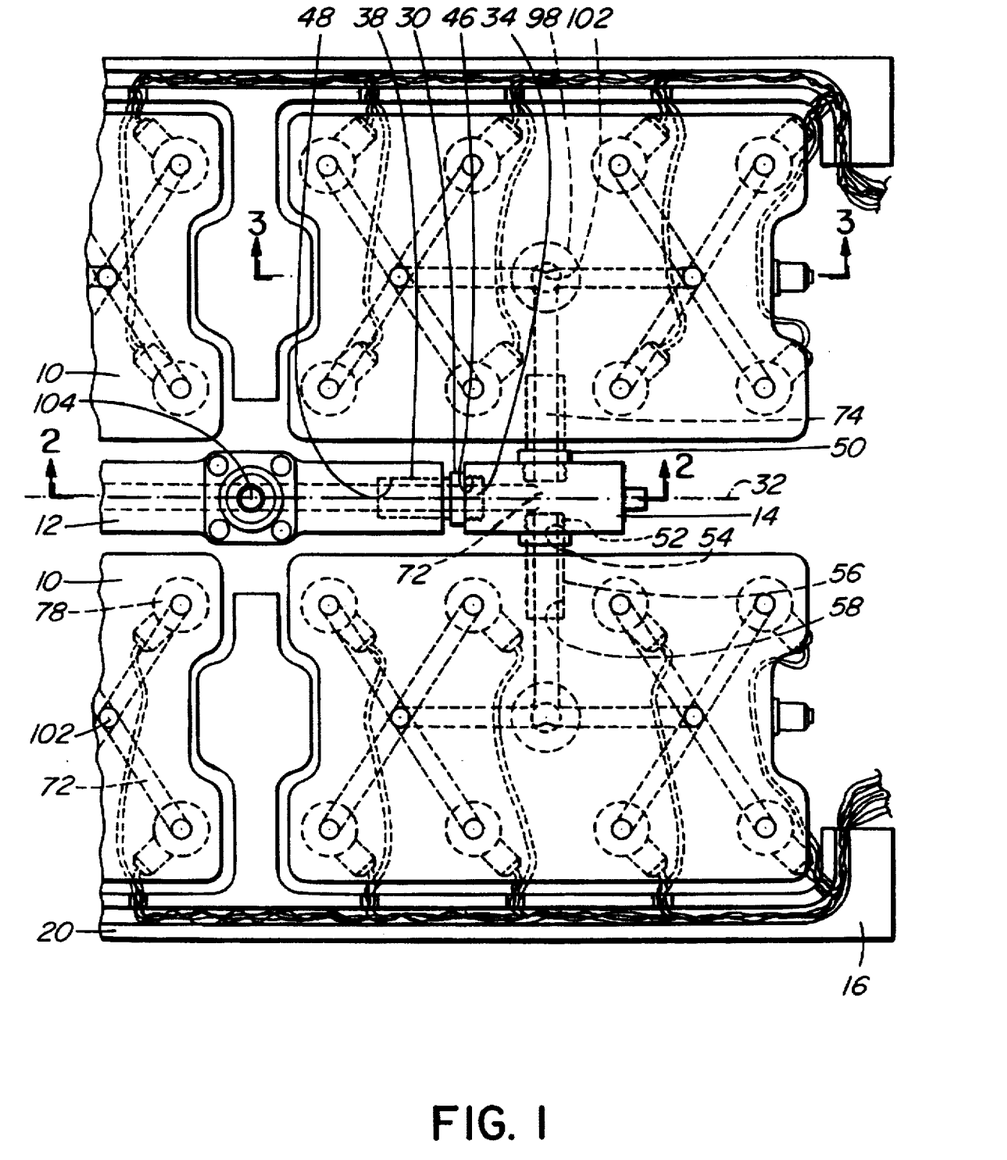
FIG. 1 is a plan view of a portion of an injection molding system having four heated nozzle manifolds connected to a central manifold in a partially assembled mold according to one embodiment of the invention.
Figure 2:
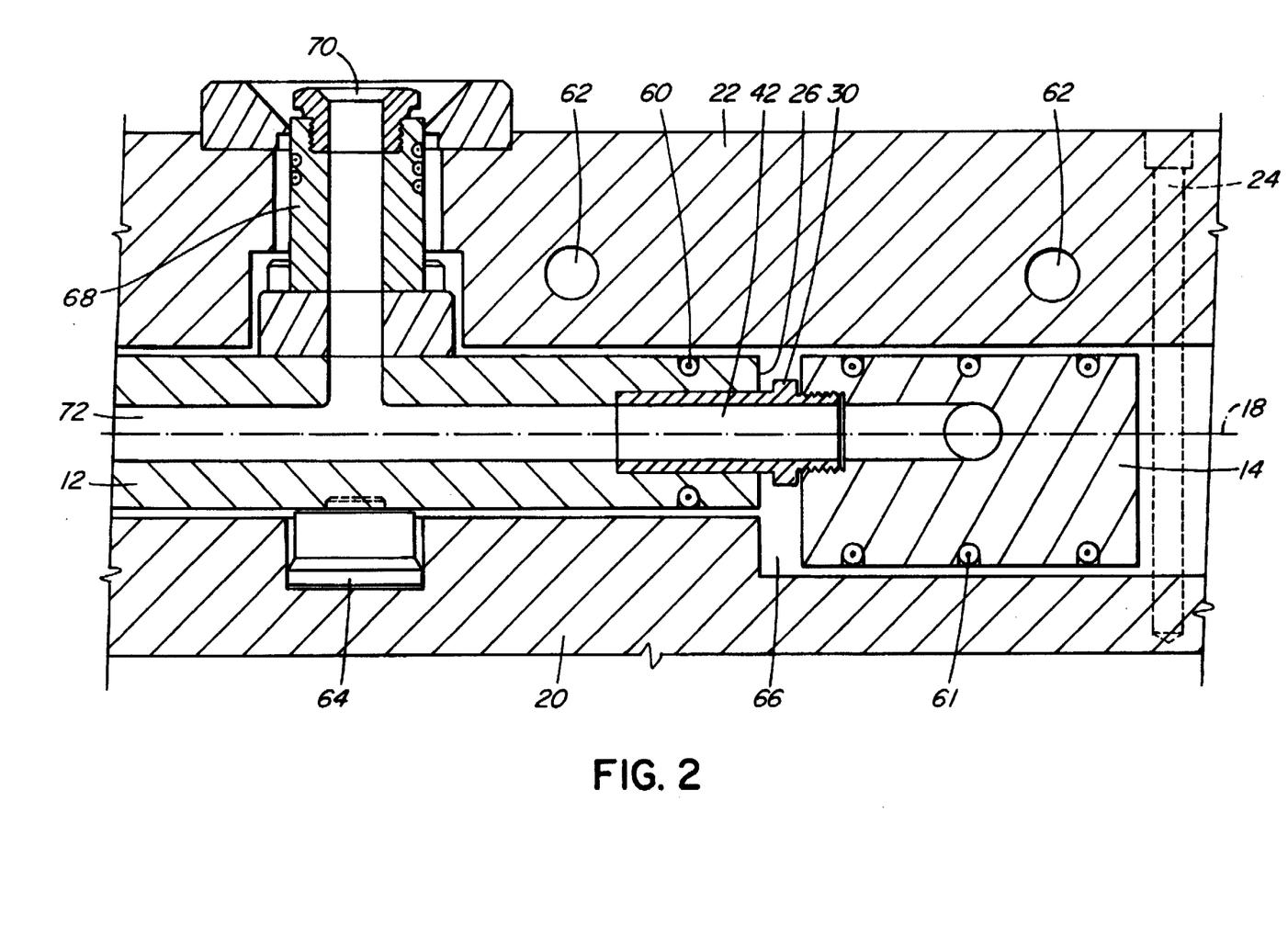
FIG. 2 is a sectional view along line 2—2 in FIG. 1.
Figure 3:
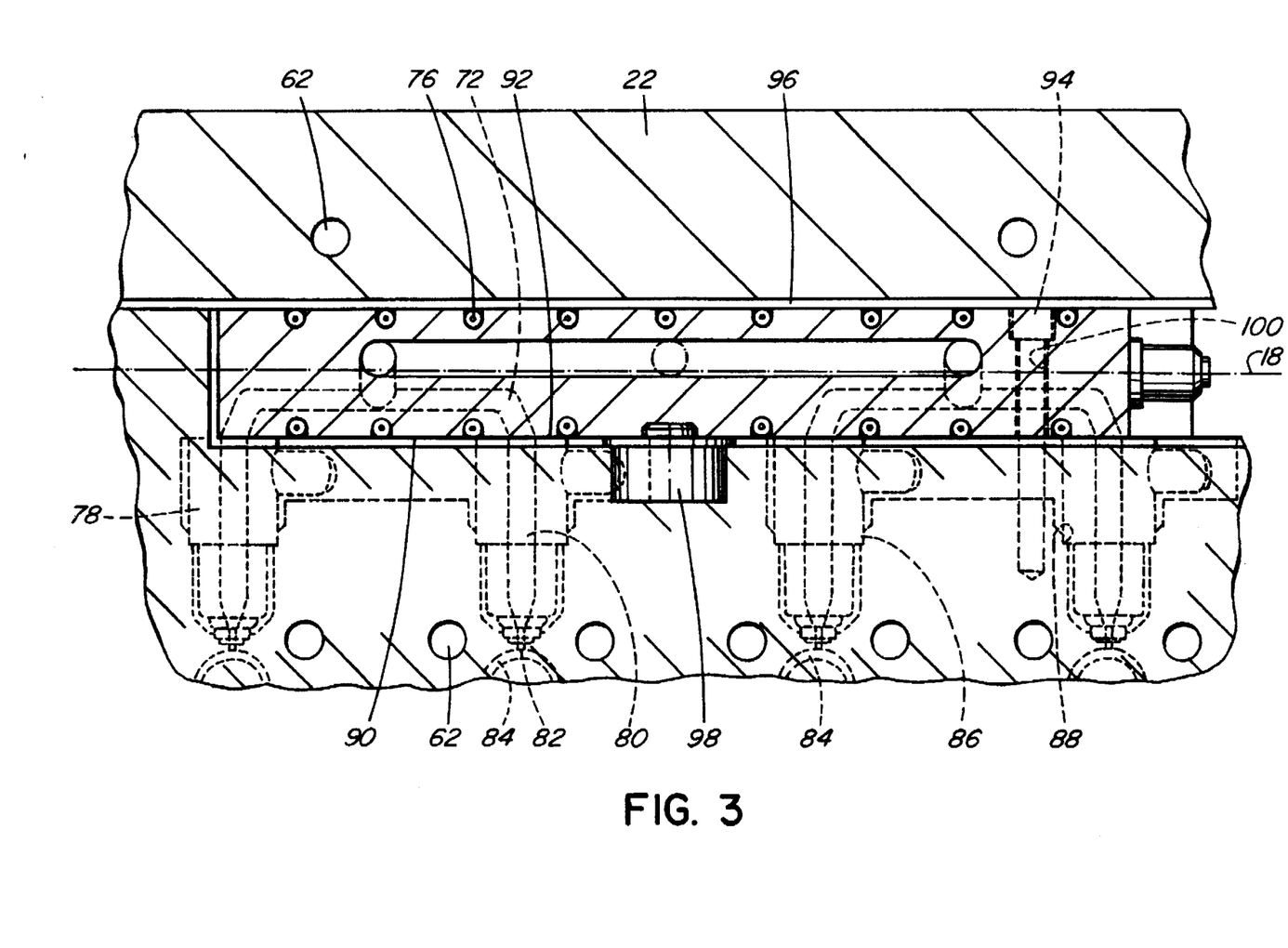
FIG. 3 is a sectional view along line 3—3 in FIG. 1.

Reference is first made to FIGS. 1, 2 and 3 which show four heated nozzle manifolds 10 connected to a heated central manifold 12 by a pair of heated connector manifolds 14 with compensation for thermal expansion and contraction among the manifolds, according to one embodiment of the invention. The manifolds are capable of being all mounted in a mold 16 in a common plane 18. While the mold 16 usually has a greater number of plates and inserts depending upon the application, in this case only a manifold retainer plate 20 and a back plate 22 which are secured together by bolts 24 are shown for ease of illustration. In other embodiments, a hydraulic plate with valve members and actuating mechanism can be used to provide a valve gated system rather than a sprue gated system.

As shown in FIG. 1, the connector manifolds 14 are connected to each end 26 of the central manifold 12 by rearwardly extending elongated connector bushings 30. A central axis 32 extends in a first direction through the central manifold 12, the connector bushings 30, and the connector manifolds 14.

Figure 4:
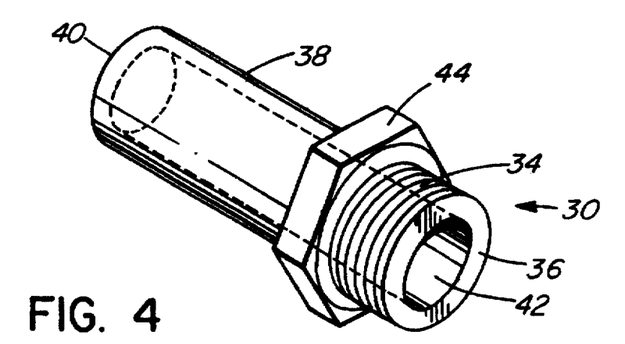
FIG. 4 is an isometric view of a melt connector bushing.

Also referring to FIG. 4, each connector bushing 30 has a threaded cylindrical portion 34 extending to one end 36 and a nonthreaded cylindrical portion 38 extending to the other end 40. The connector bushing 30 also has a central bore 42 and a hexagonal flange 44 which facilitates it being tightened into place and easily removed. In this embodiment, as seen in FIG. 1, the connector bushing 30 is mounted with the threaded portion 34 screwed into a threaded opening 46 in the connector manifold 14, and the nonthreaded portion 38 slidably received in a matching nonthreaded cylindrical opening 48 in the central manifold 12. In other embodiments, the direction can be reversed or the connector bushing 30 can have nonthreaded portions 38 at both ends, in which case the opening 46 in the connector manifold 14 would also be nonthreaded.

The nonthreaded portions 38 of the connector bushings 30 are made to fit tightly enough in the nonthreaded openings 48 in the connector bushing 30 to prevent melt leakage, but still able to slide sufficiently in the openings 48 to allow for thermal expansion and contraction. In this preferred embodiment, the manifolds 10, 12, 14 are made of a material such as steel, having a relatively lower coefficient of expansion and the connector bushings 30 are made of a material such as beryllium copper alloy having a greater coefficient of expansion. In this way the connector bushings 30 can easily be installed and then expand into a tighter fit when they are heated to the operating temperature and exposed to high pressure. In other embodiments the components can all be made of the same material and preloaded.

A pair of the nozzle manifolds 10 are mounted on opposite sides of each of the connector manifolds 14. Each of the nozzle manifolds 10 is connected to the connector manifold 14 by an elongated connector bushing 50 which extends sidewardly from each connector manifold 14. These sidewardly extending connector bushings 50 are substantially the same as the rearwardly extending connector bushing 30 described above and shown in FIG. 4. In particular, each of the sidewardly extending connector bushings 30 has a threaded portion 52 received in a threaded opening 54 in the connector manifold 14 and a nonthreaded portion 56 received in a nonthreaded opening 58 in the nozzle manifold 10. As described above, the nonthreaded portion 56 of each connector bushing 50 is made to fit tightly enough in the nonthreaded opening 58 in the nozzle manifold 10 to prevent melt leakage, but still able to slide sufficiently in the opening 58 to allow for thermal expansion and contraction. Of course, in other embodiments their direction can be reversed with their nonthreaded portions 56 received in the connector manifold.

As seen in FIG. 2, the central manifold 12 is preferably heated by an integral electrical heating element 60, each connector manifold 14 is preferably heated by an integral electrical heating element 61, and the mold 16 is preferably cooled by pumping cooling water through cooling conduits 62. The heated central manifold 12 is located by a central locating ring 64 seated between it and the manifold retainer plate 20. An air space 66 is provided between the heated central manifold 12 and the cooled mold 12, as well as between the heated connector manifolds 14 and the cooled mold 12 to thermally insulate the heated manifolds from the surrounding cooled mold 12.

The central manifold 12 also has a heated central manifold extension or inlet bushing 68 which extends rearwardly through the back plate 22 to a central inlet 70. A melt passage 72 extends from the central inlet 70, branches in the central manifold 12, and extends in opposite directions from the central manifold 12 through the central bore 42 of the connector bushings 30 into the connector manifold 14. The melt passage 72 branches again in the connector manifolds 14 and extends in opposite directions from each of the connector manifolds 14 through a central bore 74 in each of the connector bushings 50 into each of the nozzle manifolds 10.

Each nozzle manifold 10 is also heated by an integral electrical heating element 76 and has a number of heated nozzles 78 extending from it. While nozzle manifolds 10 and the melt passage through them can have various configurations, in this case the melt passage 72 branches in each nozzle manifold 10 and extends to eight spaced heated nozzles 78. As best seen in FIG. 3, the melt passage 72 continues through a central melt bore 80 through each nozzle 78 to a gate 82 leading to a cavity 84. The arrangement of the various manifolds and connector bushings the configuration of the melt passage 72 through them ensures that the length of melt flow to each gate 82 in the system is exactly the same.

Each nozzle 78 is located with its central melt bore 80 aligned with the gate 82 by a circumferential locating bushing 86 seated in a circular seat 88 in the manifold retainer plate 20. The front face 90 of each nozzle manifold 10 abuts against the rear ends 92 of the nozzles 78 and is secured in this position by screws 94 extending into the manifold retainer plate 20. In this position, an insulative air space 96 is provided between each heated nozzle manifold 10 and the surrounding cooled mold 16. Each nozzle manifold 10 is centrally located by a locating ring 98 seated between it and the manifold retainer plate 20. The screws 94 holding each nozzle manifold 10 in place extend through holes 100 in the nozzle manifold 10 which are enough larger than the screws 94 to allow for movement of the nozzle manifold 10 due to thermal expansion and contraction over the distance of each particular nozzle 78 away from the center 102 of the nozzle manifold 10.

In use, after assembly as shown, cooling water is pumped through cooling conduits 62 to cool the mold 16 and electrical power is applied to the heating elements 60, 61, 76, to heat the manifolds 10, 12, 14 and the connector bushings 30, 50 to the operating temperature. This, of course causes the manifolds 10, 12, 14 and the connector bushings 30, 50 to expand relative to the surrounding cooled mold 16.

The central manifold 12 and each of the nozzle manifolds 10 are centrally located by the locating rings 64, 98 and the change in distance between them due to thermal expansion is absorbed or compensated for by the connector bushings 30, 50. The nonthreaded portion 38 of each connector bushing 30 slides in the nonthreaded opening 48 in the central manifold 12 to absorb the thermal expansion in a first direction along the centre axis 32. The nonthreaded portion 56 of each connector bushing 50 slides in the nonthreaded opening 58 in the respective nozzle manifold 10 to absorb the thermal expansion in a second direction perpendicular to the first direction. As previously noted, the relative orientation of the threaded portions and nonthreaded portions may be varied between the manifolds.

Of course, the nozzles 78 are each centrally located so the amount of thermal expansion of each nozzle manifold 10 between its center 102 and each nozzle 78 must still be precalculated and the nozzle manifolds 10 made with each branch of the melt passage 72 dimensioned to slide into exact alignment with the melt bore 80 of one of the nozzles 78 as the operating temperature is reached. However, the distance of the furthest of nozzles 78 from the center 102 of the nozzle manifold 10 is much less than the distance of the furthest of nozzles 78 from the center 104 of the central manifold 12. In other words, the use of the connector manifolds 14 and connector bushings 30, 50 limits the amount of thermal expansion and contraction that must be accommodated in the conventional manner, ie, to the distance between each nozzle 78 and the center 102 of the nozzle manifold 10. While heated connector manifolds 14 with connector bushings 30, 50 are shown, in other embodiments they can be replaced by Tee couplings similarly slidably connected between the central manifold 12 and each pair of nozzle manifolds 10.

After the manifolds 10, 12, 14 have expanded into place with each branch of the melt passage 72 aligned with the melt bore 80 through one of the nozzles 78, pressurized melt is applied from a molding machine (not shown) to the central inlet 70 of the melt passage 72 according to a predetermined cycle. The melt flows through the melt passage 72 in the manifolds 10, 12, 14 to the aligned central melt bore 80 in each nozzle 78 and then through the gates 82 into the cavities 84 in the mold 16. After the cavities 84 are filled and a suitable packing and cooling period has expired, the injection pressure is released and the melt conveying system is decompressed to avoid stringing through the open gates 82. The mold 16 is then opened to eject the molded products. After ejection, the mold 16 is closed and the cycle is repeated continuously with a cycle time dependent upon the size of wall section of the molded part and the type of material being molded.

Reference is now made to FIGS. 5–8 which show an injection molding system according to another embodiment of the invention. As many of the elements are the same as those described above, elements common to both embodiments are described and illustrated as before using the same reference numerals.

Figure 5:
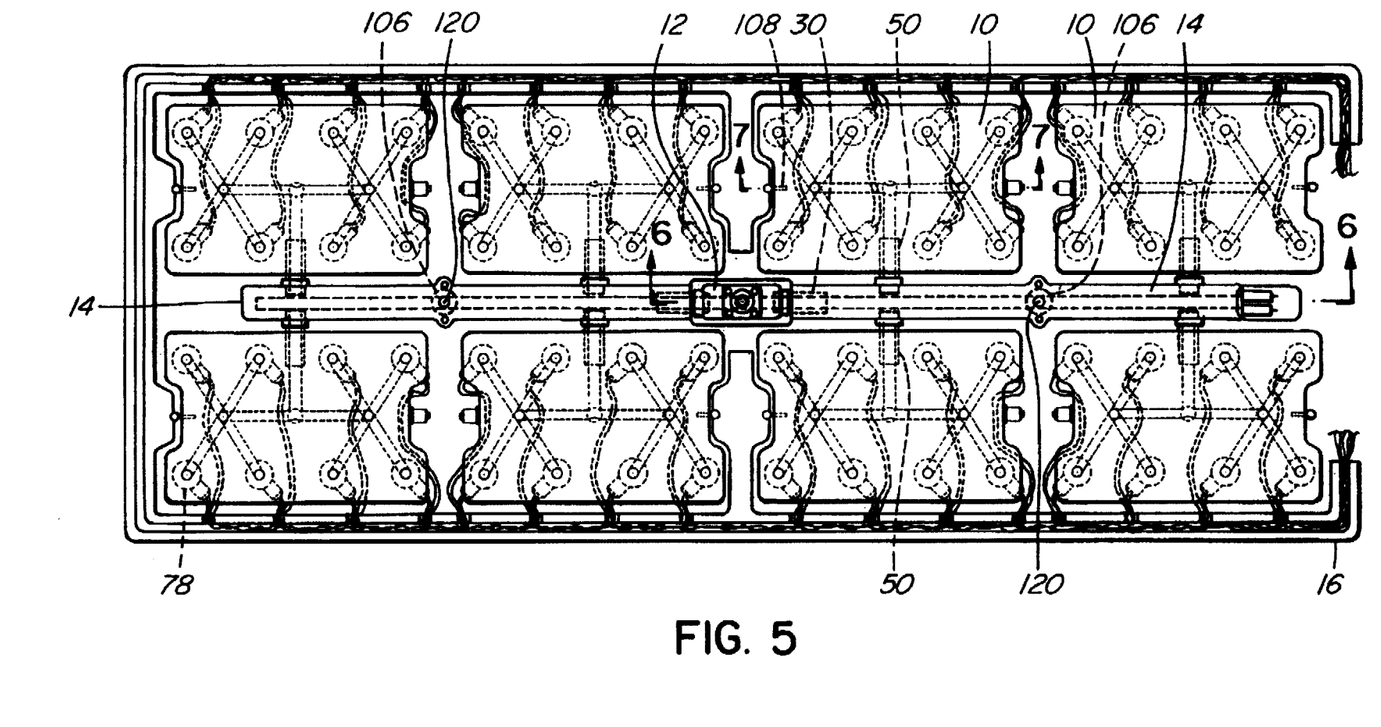
FIG. 5 is a plan view of a pair of connector manifolds connecting eight heated nozzle manifolds to a central manifold in a partially assembled mold according to another embodiment of the invention.
Figure 6:
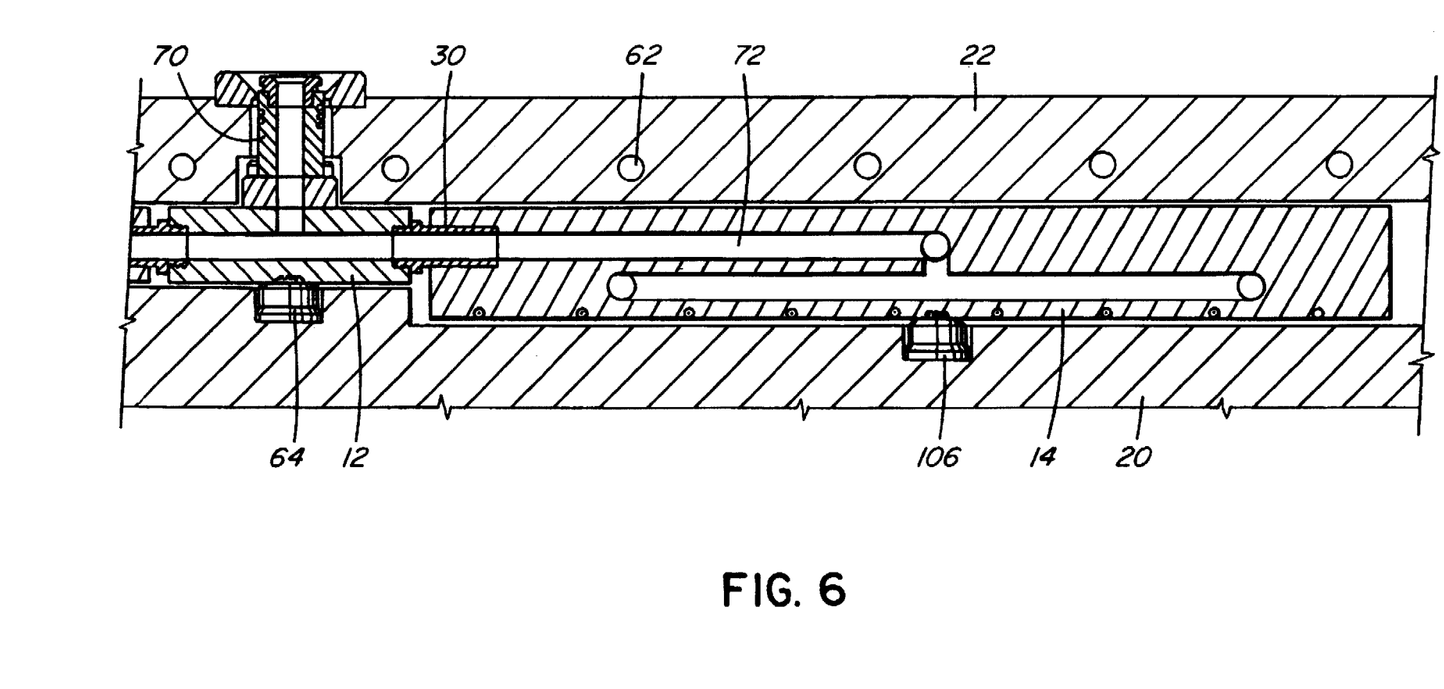
FIG. 6 is a sectional view along line 6—6 in FIG. 5.
Figure 7:
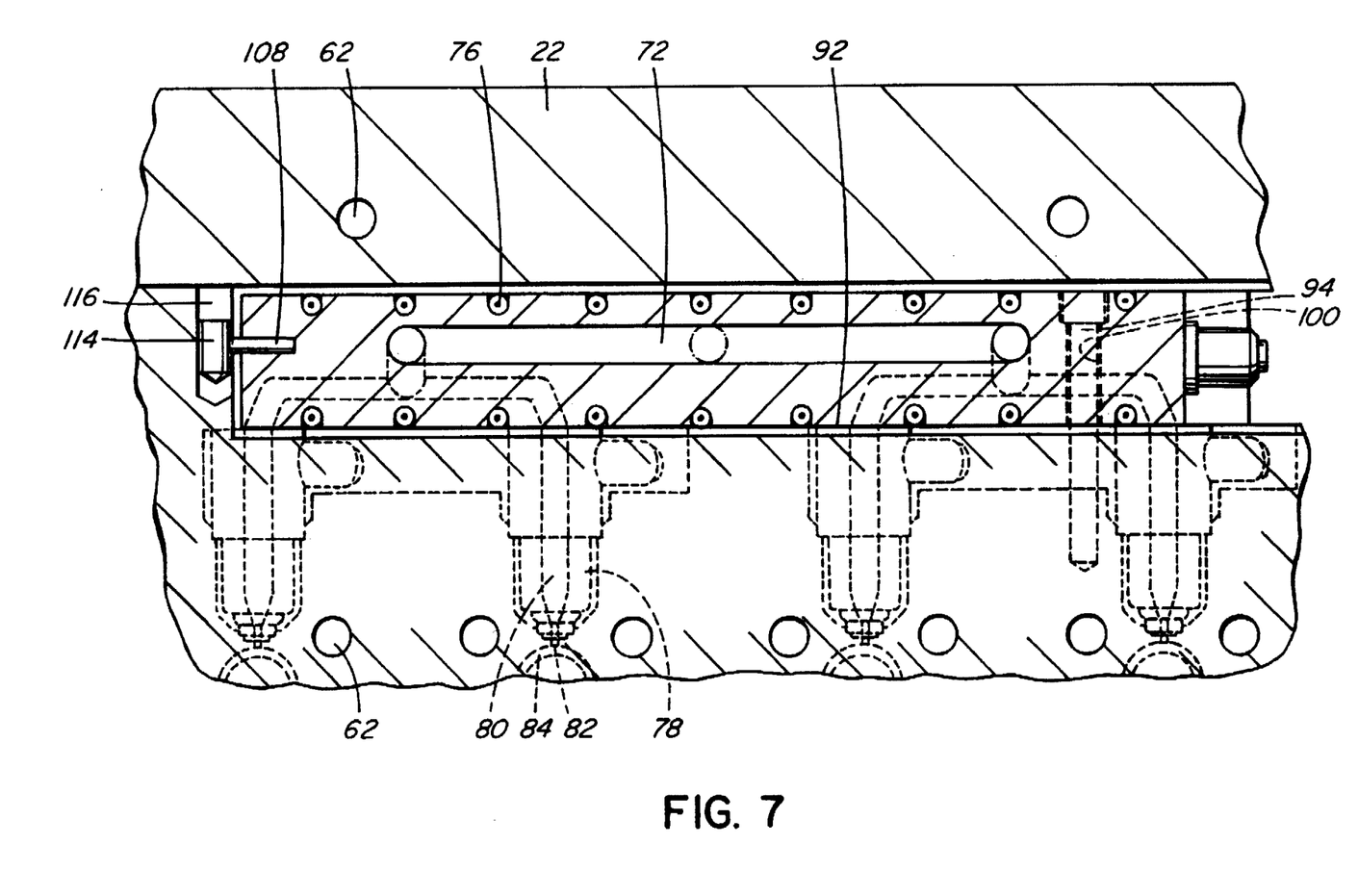
FIG. 7 is a sectional view along line 7—7 in FIG. 5.
Figure 8:
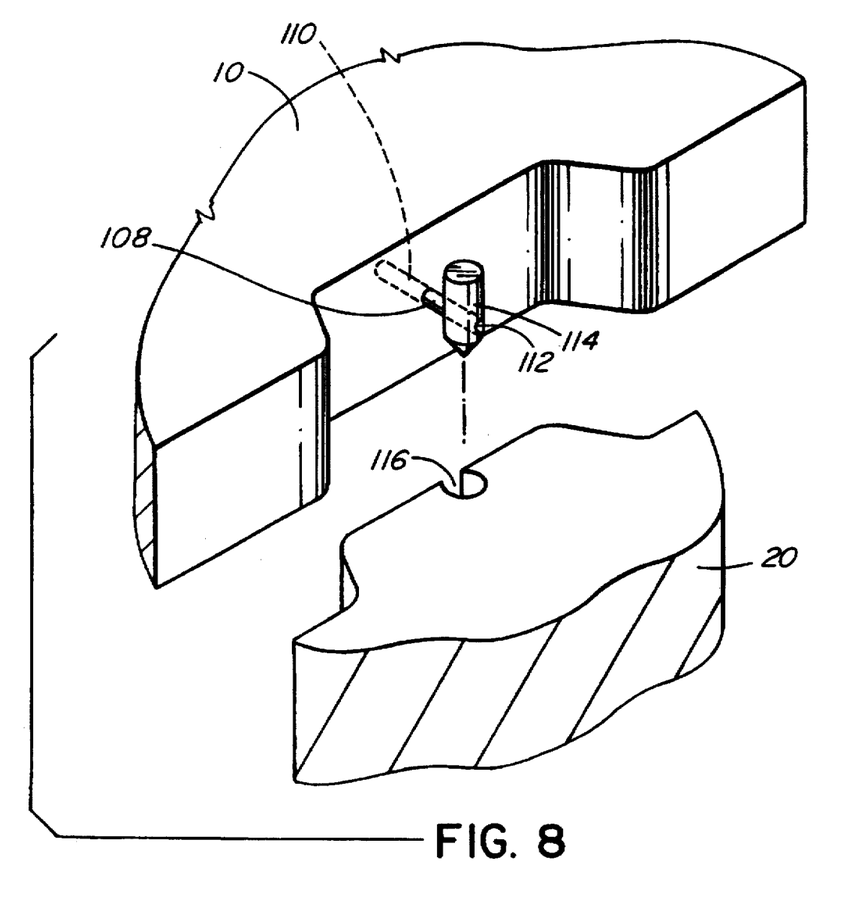
FIG. 8 is an isometric view showing a nozzle manifold with a locating pin and cam seen in FIG. 7 in position to be received in a channel in the mold.

As seen in FIG. 5, the two connector manifolds 14 are still slidably connected to the central manifold 12 by connector bushings 30 extending in the first direction, but in this case the connector manifolds 14 are much longer, and each connector manifold 14 extends between multiple pairs (rather than a single pair) of nozzle manifolds 10. While the nozzle manifolds 10 are still slidably connected to the connector manifolds 14 by connector bushings 50 extending in the second direction, as seen in FIG. 6, each of the connector manifolds 14 is centrally located by a locating ring 106 seated between it and the manifold retainer plate 20. While each nozzle manifold 10 is partially located by the connector bushing 50 extending from the connector manifold 14, it is also located by an elongated locating pin 108. As seen in FIGS. 5 and 8, the locating pin 108 extends from a hole 110 in the nozzle manifold 10 into a hole 112 in a cam 114 which is received in a channel 116 in the manifold retainer plate 20. As seen in FIG. 7, the locating pin 108 extends in the first direction parallel to the central axis 32 and, in this embodiment, is aligned with the center 102 of the nozzle manifold 10.

Thus, as the manifolds 10, 12, 14 are heated to the operating temperature, the nonthreaded portion 38 of each connector bushing 30 slides in a nonthreaded opening 118 in one of the connector manifolds 14 to absorb the thermal expansion in the first direction along the central axis 32 between the fixed center 104 of the central manifold 12 and the fixed center 120 of the connector manifold 14. While the effects of thermal expansion for the distance between the center 104 of the central manifold 12 and the center 120 of the connector manifold 14 are thus absorbed, allowance must still be made for the effects of thermal expansion for the distance between the fixed center 120 of the connector manifold 14 and each nozzle 78. In this manner, as described above, holes 100 are made enough larger than the screws 94 extending through them to allow each nozzle manifold 10 to slide across the rear ends 92 of the nozzles 78 which are fixed in place. The amount of movement at each nozzle 78 is precalculated and the nozzle manifolds 10 made with each branch of the melt passage 72 dimensioned to slide into exact alignment with the melt bore 80 of one of the nozzles 78 as the operating temperature is reached. The locating pin 108 allows each nozzle manifold 10 to move in the first direction parallel to the central axis 32, but prevents it moving in the second direction perpendicular to the first direction. The amount of movement in the first direction of the melt passage 72 communicating with the melt bore 80 at each nozzle 78 is a combination of the expansion of the connector manifold 20 from its center 120 to the connector bushing 50 and of the nozzle manifold 10 from which it extends. The amount of movement in the first direction therefore depends upon the distance in the first direction of each particular nozzle 78 from the locating ring 106 at the center 120 of the connector manifold 14.

As they are heated, the connector manifolds 14 and the nozzle manifolds 10 also expand towards each other in the second direction. However, the nonthreaded portion 56 of the connector bushing 50 extending to each nozzle manifold 10 slides in the nonthreaded opening 58 in the nozzle manifold 10 to absorb or compensate for this relative expansion between the connector manifold 14 and the nozzle manifold 10 in the second direction. Thus, the connector bushing 50 absorbs the relative movement of the manifolds 10, 14 due to thermal expansion in the second direction so the locating pin 108 can be used to locate each nozzle manifold 10 in the second direction but allow it to slide in the first direction. As a result the amount of movement in the second direction of the melt passage 72 relative to the melt bore 80 at each nozzle 78 depends upon the distance that nozzle 78 is offset from the locating pin 108.

Thus, the combination of the connector bushing 50 and the locating pin 108 allow sufficient movement of each nozzle manifold 10 in both the first and second directions to provide for thermal expansion of the heated manifolds 12, 14 relative to the cooled mold 16. Of course, this movement is reversed if the heating elements 60, 61, 76 are turned off and the manifolds 10, 12, 14 cool off for disassembly or repair. While locating pins 108 and cams 114 are shown, in other embodiments other locating means can be used which locate the nozzle manifolds 10 in the second direction, but allow them to slide freely in the first direction.

While the description of the injection molding apparatus has been given with respect to preferred embodiments, it will be evident that various other modifications are possible without departing from the scope of the invention as understood by those skilled in the art and as defined in the following claims. For instance, rather than having an inlet bushing 70, the central manifold 12 can be a melt transfer manifold in a stack molding system.

The embodiments of the invention in which an exclusive property or privilege is claimed is defined as follows:

1. In an injection molding apparatus having a heated central manifold and a plurality of heated nozzle manifolds mounted in a mold with a melt passage branching in the central manifold for conveying melt through the nozzle manifolds from a central inlet in the central manifold to a plurality of heated nozzles extending from each nozzle manifold, each nozzle seated in the mold with a central melt bore extending in alignment with a gate leading to a cavity, the improvement wherein;

the central manifold is centrally located relative to the mold, a pair of connector means extend in opposite directions from the central manifold thereby defining a central axis, and at least one pair of heated nozzle manifolds are mounted on opposite sides of each connector means, whereby each nozzle manifold is offset from the central axis with the central manifold, the nozzle manifolds and the connector means all extending in a common plane, and locating means locate at least one of each of the connector means and each of the nozzle manifolds relative to the mold, the melt passage extends outwardly from the central manifold to each connector means, then branches in each connector means and extends sidewardly to each of the nozzle manifolds, and then branches in each nozzle manifold to extend to the melt bore through each nozzle extending from each nozzle manifold, each connector means is slidably connected rearwardly to the central manifold and slidably connected sidewardly to each adjacent nozzle manifold, thereby to compensate for thermal expansion and contraction of the heated manifolds relative to the cooled mold sufficiently to enable at least one of the connector means and the nozzle manifolds to be located relative to the mold, each nozzle manifold being made and mounted so thermal expansion within the central manifold, connector means, and nozzle manifolds slides the branches of the melt passage into alignment with the melt bores through the nozzles when the manifolds and connector means are heated to the operating temperatures.

2. Injection molding apparatus as claimed in claim 1 wherein each connector means includes a heated connector manifold.

3. Injection molding apparatus as claimed in claim 2 wherein each connector manifold has one elongated connector bushing extending rearwardly to the central manifold through which the melt passage extends to provide a slidable connection with the central manifold, and other elongated connector bushings extending outwardly on opposite sides of the connector manifold through which the melt passage extends to each nozzle manifold to provide a slidable connection with each of the nozzle manifolds.

4. Injection molding apparatus as claimed in claim 3 wherein each connector bushing has at least one non-threaded cylindrical portion extending from one end and a melt bore extending centrally therethrough from said one end to the other end, the at least one nonthreaded portion of each said one connector bushing being received in a nonthreaded cylindrical opening aligned with the melt passage in one of the central manifold and said each connector manifold, the at least one nonthreaded portion of each said other connector bushing being received in a nonthreaded cylindrical opening aligned with the melt bore in one of the connector manifold and said each nozzle manifold, the nonthreaded portion of the connector bushing fitting in said nonthreaded cylindrical opening to allow the nonthreaded portion of the connector bushing to slide sufficiently in said nonthreaded cylindrical opening without allowing leakage of pressurized melt flowing through the melt passage.

5. Injection molding apparatus as claimed in claim 3 wherein each connector bushing has a threaded cylindrical portion extending from one end, a nonthreaded cylindrical portion extending from the other end, and a melt bore extending centrally therethrough from said one end to said other end, the threaded portion of each said one connector bushing being removably secured in a threaded cylindrical opening aligned with the melt passage in one of the central manifold and said each connector manifold, the nonthreaded portion of each said one connector bushing being received in a nonthreaded cylindrical opening aligned with the melt passage in the other of the central manifold and said each connector manifold, the threaded portion of each said other connector bushing being removably secured in a threaded cylindrical opening aligned with the melt passage in one of the connector manifold and said each nozzle manifold, the nonthreaded portion of each said other connector bushing being received in a nonthreaded cylindrical opening aligned with the melt passage in the other of the connector manifold and said each nozzle manifold, the nonthreaded portion of the connector bushing fitting in said nonthreaded cylindrical opening to allow the nonthreaded portion of the connector bushing to slide sufficiently in said nonthreaded cylindrical opening without allowing leakage of pressurized melt flowing through the melt passage.

6. Injection molding apparatus as claimed in claim 5 wherein said nonthreaded cylindrical portion of each of the connector bushing is characterized by a predetermined outer diameter, and each nonthreaded opening aligned with the melt passage characterized by a predetermined inner diameter, said predetermined outer diameter being smaller than said predetermined inner diameter just sufficient that said nonthreaded cylindrical portion of the connector bushing can be fitted into said nonthreaded cylindrical opening.

7. Injection molding apparatus as claimed in claim 6 wherein said predetermined outer diameter is sufficiently close in size to said predetermined inner diameter as to form a sealing engagement sufficient to prevent excessive amounts of molten plastic from escaping therebetween.

8. Injection molding apparatus as claimed in claim 7 wherein the nonthreaded cylindrical portion of the connector bushing is made of a material having a larger coefficient of expansion than the material that surrounds the second cylindrical opening.

9. Injection molding apparatus as claimed in claim 3 wherein there are one pair of heated nozzle manifolds mounted on opposite sides of each connector manifold and the locating means is a locating ring seated between the mold and each nozzle manifold to locate each nozzle manifold relative to the mold.

10. Injection molding apparatus as claimed in claim 9 wherein each locating ring is aligned with the center of the respective nozzle manifold.

11. Injection molding apparatus as claimed in claim 3 wherein the locating means comprises a locating ring seated between the mold and each connector manifold to locate each connector manifold relative to the mold and a slidable locating device extending between the mold and each nozzle manifold, said other connector bushings each locating one of the nozzle manifolds relative to the connector manifold in a first direction along the central axis while allowing movement to compensate for thermal expansion and contraction of said one nozzle manifold and the connector manifold in a second direction substantially perpendicular to the first direction, said slidable locating device locating said each nozzle manifold relative to the mold in said second direction while allowing movement of said each nozzle manifold relative to said mold in said first direction, whereby the combination of said connector bushing and said slidable locating devices allow sufficient movement in both the first and second directions to provide for thermal expansion and contraction of the heated manifolds relative to the cooled mold.

12. Injection molding apparatus as claimed in claim 11 wherein each locating ring is aligned with the center of the respective connector manifold.

13. Injection molding apparatus as claimed in claim 12 wherein there are one pair of heated nozzle manifolds mounted on opposite sides of each connector manifold.

14. Injection molding apparatus as claimed in claim 12 wherein there are two pairs of heated nozzle manifolds mounted on opposite sides of each connector manifold.

15. Injection molding apparatus as claimed in claim 11 wherein each locating device has an elongated locating member extending in the first direction, the elongated locating member being slidable with respect to at least one of the mold and said each nozzle manifold.

16. Injection molding apparatus as claimed in claim 15 wherein the locating member extends in alignment with the center of said each nozzle manifold.

17. Injection molding apparatus as claimed in claim 16 wherein the locating member is a locating pin.

* * * * *